United States Patent Office 3,600,378
Patented Aug. 17, 1971

3,600,378
METHOD FOR THE PURIFICATION OF
LIPOPOLYSACCHARIDES
David G. Marsh and Michael J. Crutchley, both of
183–193 Euston Road, London, NW. 1, England
No Drawing. Filed Oct. 17, 1967, Ser. No. 675,781
Claims priority, application Great Britain, Oct. 27, 1966,
48,317/66
Int. Cl. C12d 13/00
U.S. Cl. 260—209                                   17 Claims

ABSTRACT OF THE DISCLOSURE

A process for the preparation of a purified non-toxic lipopolysaccharide, which comprises precipitating the lipopolysaccharides with a salt from the culture supernatant of Gram-negative bacteria, grown under conditions of vigorous aeration, redissolving the lipopolysaccharides, dialysing the redissolved precipitate, applying the solution of the lipopolysaccharides to an anionic exchanger preferentially retaining the toxic lipopolysaccharide (endotoxin) until the eluted and isolated product is substantially homogenous and non-toxic.

---

This invention relates to an improved process for purifying bacterial lipopolysaccharides, and in particular to non-toxic fractions isolated from the culture supernatant fluid of intensively aerated Gram-negative bacterial cultures.

Lipopolysaccharides from Gram-negative bacteria, hereinafter designated also LPS, are antigenic substances comprising polysaccharide, lipid and, in the native form, associated protein components. Certain toxic lipopolysaccharides have been termed "endotoxins," whilst other, non-toxic fractions have been called "native haptens." These materials are usually obtained by extracting the bacteria with a liquid containing a chemical agent or solvent, such as phenol, trichloroacetic acid, or ether. It has, however, been suggested that the original complexes are somewhat modified or degraded by these agents. For instance, at least some of the protein and lipid components can be split off with an extractant containing phenol, or the lipid content may be reduced by the use of ether or acetone. Fractions representing high and low toxicity have been isolated by Anacker et al., J. of Bacteriology, 1964, 88, 1705–1720, and ibid, 1966, 91, 1427–1433, or according to a method described in the specification of British Pat. 1,005,193 (U.S. Pat. 3,132,995). All these methods, however, suffer from the disadvantage of using the aforementioned chemical agents to liberate first the LPS mixtures from the cells with consequential changes in the structure of these complexes, and fail to provide uniform products of low or negligible toxicity in a sufficiently high yield and purity.

It has now been found that a non-toxic LPS fraction can be produced in a satisfactory yield by using, as a starting material, the supernatant liquid of Gram-negative bacterial cultures, such as a culture of Escherichia coli, grown under conditions of vigorous aeration. Furthermore, the purification and separation of the non-toxic LPS can efficiently be effected by adsorbing the endotoxin fraction onto an anionic exchanger, which is selective in this respect, until toxicity is no longer detectable, provided the fractionation is preceded by the isolation of a predominantly LPS fraction from the liquid medium by salt precipitation and subsequent dialysis.

According to the present invention, therefore, in one aspect there is provided a process for the preparation of a purified non-toxic lipopolysaccharide, which comprises precipitating the lipopolysaccharides from the culture supernatant of Gram-negative bacteria, such as E. coli, grown under conditions of vigorous aeration, dialysing the redissolved precipitate, applying the solution of the lipopolysaccharides to an anionic exchanger preferentially retaining the toxic lipopolysaccharide (endotoxin) until the eluted and isolated product is substantially homogeneous and non-toxic.

In another aspect, the invention provides an antigenic preparation, comprising a purified non-toxic LPS isolated from the culture supernatants of Gram-negative bacteria, such as E. coli, which is free of endotoxin. The process, as hereinbefore defined, may include a further step of freeze-drying, or evaporating at low temperature, to present the purified non-toxic LPS in a dry form free of solvent.

The lipopolysaccharides are released into the culture fluid by Gram-negative bacterial cultures under conditions of vigorous aeration in a medium provided with all necessary nutrients for growth. To obtain the best results, the pH of the growth medium is maintained around pH 6 to 8, depending to a certain extent on the type of organism employed. Most strains of Escherichia coli, Serratia marcescens, Salmonella typhosa of the family Enterobacteriaceae, and the strains of Pastenrella multosida and Vibrio cholerae, have been found to secrete LPS under these conditions. Nutrients containing both sucrose and acid hydrolysed casein, in addition to other usual ingredients and growth factors, have been found convenient for the purposes of the present invention.

Subsequent to the growth stage, the culture fluid of the medium is separated from the bacterial cells by means of filtration or centrifugation and the non-toxic LPS together with endotoxin are precipitated by a salt, such as ammonium sulphate, at low temperatures. The precipitate is then collected, resuspended in distilled water, and dialysed to remove low molecular weight diffusible impurities, and clarified for instance, by centrifugation. To obtain the best results, this initial purification is repeated and the solution is concentrated by freeze-drying before the solute is further purified and fractionated.

The preferred anionic exchanger for the purposes of the present invention is diethylaminoethyl cellulose, and the preferred eluent used in conjunction with this particular exchanger is an aqueous buffer of low ionic strength ($<0.01$ M) at pH 8 to obtain the non-toxic fractions. Subsequently a buffer of higher ionic strength (about 1.0 M) at a pH between 5.5 and 8.5, preferably at pH 7–8.5 elutes the endotoxins. A volatile buffer, such as ammonium hydrogen carbonate has been found satisfactory in this respect.

Diethylaminoethyl cellulose separates the non-toxic LPS from the endotoxin very effectively. It may conveniently be mixed with the solution containing both the non-toxic and toxic components, separated by filtration after equilibrium has been attained, and simply eluted on a filter or centrifuge. Alternatively, the exchanger may be used as a chromatographic column. Depending on the amount of endotoxin or other impurities in the starting material, it may be necessary to apply the solution of LPS to the exchanger more than once, and usually twice, to obtain a homogeneous, i.e. uniform, product.

In addition to the separation with the anionic exchanger, some residual non-toxic impurities can be removed by the use of xerogels such as dextran cross-linked with glyceryl bridges or acrylamide gel preparations known as Bio-Gels. A step using such material, usually as a chromatographic column, may therefore be incorporated in the purification process.

The xerogel adsorbent, such as a dextran preparation known as Sephadex G100, is more advantageously employed subsequent to the separation effected by the anionic exchanger. Although cross-linked materials have already been used to purify crude LPS mixtures, the preferred use of it according to the present invention, in conjunction with and subsequent to a separation step by means of an anionic exchanger, greatly enhances the efficacy of the cross-linked material, and provides the desired product in purity and yield hitherto attained. The term "cross-linked" is used in this context in the sense embracing not only macromolecular materials suitably linked to form sieve-like structures capable of retaining molecules of appropriate sizes, but is intended to include other materials inherently possessing chemical linkages representing structures equivalent to the above-cross-linked macromolecules with respect to their capacity to retain undesirable impurities. Some of such materials may be known as molecular sieves in the art.

Prior to use, the cross-linked material is conveniently equilibrated with a buffer, such as ammonium hydrogen carbonate, and may be prepared as a chromatographic column for the purpose. The solution containing also the non-toxic LPS is then filtered through the column. The first major peak is separated from subsequent peaks or fractions, and contains the desired non-toxic material in a sufficiently purified form. The material so obtained may then be recovered from the solution, for instance, by freeze-drying or evaporation at low temperature.

The chemical, physical and biochemical characteristics of the non-toxic LPS obtained according to the present invention may vary according to the species or serotype of the bacteria. Such material, when obtained from *E. coli*, showed an increased amount of glucosamine as compared to endotoxin. In this particular case, the glucosamine content was about 27%. Both the amino acid and the higher fatty acid contents were lower than that of the corresponding endotoxin.

Although the LPS provided by the present invention is characterised as non-toxic material, it is well understood that this is not to be taken in an absolute sense, but relative to endotoxin. The toxicity of fractions at different stages of purification can conveniently be determined by interperitoneal injection of groups of mice with graded doses of the fractions, allowing $LD_{50}$ values to be calculated and compared (Haskins et al., 1961).

Although the non-toxic LPS provided by the present invention does not stimulate antibodies detectable by gel-diffusion analysis, it does include short term non-specific resistance to infections with heterologous Gram-negative organisms. For instance, the administration of non-toxic LPS from *E. coli*, protected mice against subsequent lethal challenge with *S. typhosa*.

In a further aspect, therefore, the present invention provides a vaccine, comprising an effective dose of a purified non-toxic LPS isolated from the culture supernatants of Gram-negative bacteria, in association with a pharmaceutically acceptable carrier.

The following examples illustrate this invention:

EXAMPLE 1

*E. coli* 078K80 strain Shaw was grown in tanks for 42 hr. at 35° C. in a vigorously aerated aqueous medium containing acid-hydrolysed casein (5% w./v.), sucrose (3% w./v.) and yeast extract (10% w./v.), adjusted to pH 6.5. Prior to inoculation, the medium was clarified, heated to 85° C. and sterilized by Seitz filtration.

The bacteria were removed from suspension by means of a De Laval centrifugal separator and the supernatant was sterilised by filtration, through a Seitz filter. Ammonium sulphate (approx. 700 g./litre) was dissolved in the culture supernatant and the solution was allowed to stand at 4° C. for 6 days. The brown flocculent precipitate was recovered by centrifugation, resuspended in distilled water and dialysed to remove the salt. The LPS was reprecipitated at 4° C. by addition of ammonium sulphate (65 g./100 ml. of solution). The reprecipitated material was redissolved and was treated as above to remove salt, clarified by centrifugation and freeze-dried, giving a brown powder.

A solution of crude LPS so obtained from the salt-precipitation stages (600 mg. in 30 ml. of 0.005 M $NH_4HCO_3$) was applied to a Büchner column (8 cm. x 10 cm. dia.), containing diethylaminoethyl cellulose (Whatman DE 11, capacity 1 meq. $OH^-$/g.) equilibrated to pH 8 and suspended in 0.005 ($MNH_4HCO_3$). Elution was performed successively with (i) 0.01 $MNH_4HCO_3$ (1250 ml.) and (ii) 1 M ammonium acetate-acetic acid buffer at pH 5.5 (500 ml.). A single peak of weakly ultraviolet-absorbing material (at 230, 260 and 275 m$\mu$) was eluted with buffer (i), which proved to be almost (95%) pure non-toxic LPS. The bulk of the remaining material was eluted with buffer (ii), which was shown to contain endotoxin. Both fractions protected mice against a subsequent challenge to *S. typhosa* 24 hours after injection.

Both fractions were further, separately purified by gel filtration on a Sephadex G100 column (167.5 cm. x 1.2 cm. dia.). The first major peaks of ultraviolet absorbing materials in each experiment contained the respective purified non-toxic LPS and endotoxin.

The non-toxic fraction was found free of any significant amounts of impurities by gel filtration, electrophoresis and ultracentrifugal analysis. The isolated material from this fraction was found to be non-toxic at 0.6 mg./20 g. mouse or 25 mg./kg. in guinea pigs. No further tests were made above these levels.

Chemically this non-toxic LPS contained 4.32% N, 8.89% P, 26–27% glucosamine, 1.2–1.4% amino acid and 0.1% fatty acid ($>C_4$). No significant quantities of pentose or 2-keto-3-deoxyoctulonic acid was detectable. The product was distinguishable from the native haptens obtained by the phenolic extraction method described by Anacker et al., J. of Bacteriology, 1964, 88, 1705, in that it had a significant phosphorus content and had no absorption maximum at 260 m$\mu$.

A solution containing 0.007 $\mu$g. of non-toxic LPS in 0.85% saline solution was found to protect 50% of mice in a group against a lethal challenge of *S. typhosa* (Strain TY2) containing 3 $LD_{50}$'s.

EXAMPLE 2

In another experiment a non-toxic endotoxin fraction was obtained according to the method described in Example 1, the only difference being the use of a Sephadex G100 column before the chromatography on diethylaminoethyl cellulose, and not after it. The product was isolated in a lower yield, but had substantially identical characteristics with that obtained in Example 1.

EXAMPLE 3

In another experiment, an aqueous solution of the crude LPS, obtained from the salt precipitation and dialysis stages as described in Example 1, was mixed with a de-aerated aqueous slurry of DEAE-cellulose which had previously been equilibrated to pH 7–8. Sufficient diethylaminoethyl-cellulose was added to adsorb the bulk of the endotoxin and components other than the non-toxic LPS (30–40 g. Whatman DE 11 DEAE-cellulose per g. dissolved crude LPS). The slurry was allowed to stand at room temperature for 30 min., with occasional stirring. A layer of about 1 cm. of DEAE-cellulose, equilibrated to pH 7–8 and suspended in distilled water was placed on a Büchner column (10 cm. dia.) and covered with a circle of Whatman No. 1 filter paper, (10 cm. dia.). The slurry containing the LPS was poured carefully into the funnel and the eluent was collected. Further elution to remove the remaining non-toxic LPS was performed using 0.01 M $NH_4HCO_3$ until the ultraviolet absorbance of the eluent (at 230 m$\mu$) indicated that virtually all the non-toxic LPS had been removed from the column. The non-toxic LPS in the eluent was further purified in a similar fashion if necessary, in order to remove residual impurities.

The purified non-toxic LPS was of a similarly high degree of purity and had identical properties to the preparation described in Example 1.

The crude preparation of endotoxin was removed from the Büchner column, at the first stage of purification, by elution with 1M ammonium acetate buffer at pH 5.5-8 after the non-toxic LPS had been eluted from the column. The endotoxin was further purified by gel filtration as described in Example 1.

The high yields obtained by this method and its ease of application rendered it particularly suitable for the large-scale preparation of non-toxic LPS.

What we claim is:

1. A process for the preparation of a purified non-toxic lipopolysaccharide, which comprises precipitating with a salt the non-toxic lipopolysaccharides together with endotoxin from the culture supernatant of Gram-negative bacteria, grown under conditions of vigorous aeration, redissolving the non-toxic lipopolysaccharide and endotoxin precipitate, dialysing the redissolved precipitate, applying the solution of the lipopolysaccharides to an anionic exchanger preferentially retaining the toxic lipopolysaccharide (endotoxin) until the eluted and isolated product is substantially homogeneous and non-toxic.

2. A process according to claim 1, in which the bacteria are of the family Enterobacteriaceae.

3. A process according to claim 2, in which the bacteria are of the strain *Escherichia coli*.

4. A process according to claim 1, in which non-toxic impurities are removed by the use of xerogels.

5. A process according to claim 4, in which the xerogel is a cross-linked material.

6. A process according to claim 5, in which the cross-linked material is a dextran preparation cross-linked with glyceryl bridges.

7. A process according to claim 4, in which the xerogel is used subsequent to the separation effected by the anionic exchanger.

8. A process according to claim 1, in which the growth medium for the bacteria is maintained around pH 6 to 8.

9. A process according to claim 1, which includes the step of freeze-drying the eluent fraction containing the purified non-toxic lipopolysaccharide.

10. A process for the preparation of a purified non-toxic lipopolysaccharide, which comprises precipitating with a salt the non-toxic lipopolysaccharides together with endotoxin from the culture supernatant of Gram-negative bacteria, grown under conditions of vigorous aeration, redissolving the non-toxic lipopolysaccharides together with endotoxin precipitate, dialysing the redissolved precipitate, applying solution of the lipopolysaccharides to an anionic exchanger preferentially retaining the toxic lipopolysaccharide (endotoxin) until the eluted and isolated product is substantially homogeneous and non-toxic, wherein the anionic exchanger is diethylaminoethyl cellulose and wherein the eluent is an aqueous buffer of pH 8 having an ionic strength below 0.01 M.

11. A process according to claim 10, in which the buffer contains ammonium hydrogen carbonate.

12. A process for the preparation of a purified non-toxic lipopolysaccharide, which comprises precipitating with a salt the non-toxic lipopolysaccharides together with endotoxin from the culture supernatant of Gram-negative bacteria, grown under conditions of vigorous aeration, redissolving the non-toxic lipopolysaccharides together with endotoxin precipitate, dialysing the redissolved precipitate, applying the solution of the lipopolysaccharide to an anionic exchanger preferentially retaining the toxic lipopolysaccharide (endotoxin) until the eluted and isolated product is substantially homogenous and non-toxic, and wherein the anionic exchanger is diethylaminoethyl cellulose.

13. A process for the preparation of a purified non-toxic lipopolysaccharide, which comprises precipitating at low temperatures with ammonium sulphate the non-toxic lipopolysaccharides together with endotoxin from the culture supernatant of gram-negative bacteria, grown under conditions of vigorous aeration, redissolving the non-toxic lipopolysaccharides and endotoxin precipitate, dialysing the redissolved precipitate, applying the solution of the lipopolysaccharides to an anionic exchanger preferentially retaining the toxic lipopolysaccharide (endotoxin) until the eluted and isolated product is substantially homogeneous and non-toxic.

14. A process according to claim 13 in which the anionic exchanger is diethylaminoethyl cellulose and wherein the eluent is an aqueous buffer of pH 8 having an ionic strength below 0.01 M.

15. A process according to claim 14 in which the buffer contains ammonium hydrogen carbonate.

16. A process for the preparation of a purified non-toxic lipopolysaccharide isolated from the culture supernatants of *Escherichia coli*, which contains at least 20% glucosamine, and has a lower amino acid and fatty acid content, having more than 4 carbon atoms than the endotoxin obtained from the same strain, and is substantially free of 2-keto-3-deoxyoctulonic acid or pentose, said process comprising precipitating with a salt the non-toxic lipopolysaccharides together with endotoxin from the culture supernatant of Escherichia bacteria, grown under the conditions of vigorous aeration, redissolving the non-toxic lipopolysaccharides and endotoxin precipitate, dialysing the redissolved precipitate, applying the solution of the lipopolysaccharides to an anionic exchanger preferentially retaining the toxic lipopolysaccharide (endotoxin) until the eluted and isolated product is substantially homogeneous and non-toxic.

17. A process according to claim 16 in which the salt is ammonium sulphate and in which the reaction takes place at low temperatures.

References Cited

UNITED STATES PATENTS

| | | | |
|---|---|---|---|
| 3,438,862 | 4/1969 | Work | 195—31 |
| 3,438,865 | 4/1969 | Work et al. | 195—31 |

OTHER REFERENCES

Anacker et al., J. of Bacteriology, pp. 1705-20, vol. 88, No. 6, 1964.

A. LOUIS MONACELL, Primary Examiner

G. M. NATH, Assistant Examiner

U.S. Cl. X.R.

195—31P; 260—211; 424—92